United States Patent
Kim et al.

(10) Patent No.: US 9,174,196 B2
(45) Date of Patent: Nov. 3, 2015

(54) SYNTHESIS METHOD FOR MAGNETITE AND BIRNESSITE AGGREGATE-FORM MIXTURE

(75) Inventors: Jae-Gon Kim, Daejeon (KR); Chul-Min Chun, Daejeon (KR); Ho-Cheol Song, Seoul (KR); In-Hyun Nam, Daejeon (KR); Dong-Wan Cho, Seoul (KR); Se-Eun Chang, Daejeon (KR)

(73) Assignee: KOREA INSTITUTE OF GEOSCIENCE AND MINERAL RESOURCES (KIGAM), Daejeon (KR)

( * ) Notice: Subject to any disclaimer, the term of this patent is extended or adjusted under 35 U.S.C. 154(b) by 257 days.

(21) Appl. No.: 13/878,299

(22) PCT Filed: Jul. 7, 2011

(86) PCT No.: PCT/KR2011/004967
§ 371 (c)(1),
(2), (4) Date: Apr. 8, 2013

(87) PCT Pub. No.: WO2012/165695
PCT Pub. Date: Dec. 6, 2012

(65) Prior Publication Data
US 2013/0200001 A1     Aug. 8, 2013

(30) Foreign Application Priority Data
May 27, 2011   (KR) .................. 10-2011-0050419

(51) Int. Cl.
| | |
|---|---|
| *B01J 20/02* | (2006.01) |
| *B01J 20/32* | (2006.01) |
| *C02F 1/28* | (2006.01) |
| *B01J 20/06* | (2006.01) |
| *C02F 1/48* | (2006.01) |
| *C02F 101/10* | (2006.01) |
| *C02F 101/16* | (2006.01) |
| *C02F 101/20* | (2006.01) |
| *C02F 101/22* | (2006.01) |

(52) U.S. Cl.
CPC .......... *B01J 20/3236* (2013.01); *B01J 20/0222* (2013.01); *B01J 20/0229* (2013.01); *B01J 20/06* (2013.01); *C02F 1/281* (2013.01); *C02F 1/288* (2013.01); *C02F 1/488* (2013.01); *C02F 2101/103* (2013.01); *C02F 2101/105* (2013.01); *C02F 2101/163* (2013.01); *C02F 2101/20* (2013.01); *C02F 2101/22* (2013.01); *C02F 2303/18* (2013.01)

(58) Field of Classification Search
CPC ....................................................... B01J 20/02
USPC ....................................................... 502/406
See application file for complete search history.

(56) References Cited

U.S. PATENT DOCUMENTS

| 5,702,674 A | 12/1997 | O'Young et al. |
| 2006/0032807 A1* | 2/2006 | Sansalone ............ 210/263 |
| 2010/0181258 A1* | 7/2010 | Qu et al. .............. 210/683 |

FOREIGN PATENT DOCUMENTS

| KR | 20030023153 A | 3/2003 |
| KR | 20040110352 A | 12/2004 |
| KR | 1020090046869 A | 12/2004 |
| KR | 1020050112692 A | 12/2005 |

OTHER PUBLICATIONS

International Search Report; mailed May 1, 2012; PCT/KR2011/004967.

* cited by examiner

*Primary Examiner* — Edward Johnson
(74) *Attorney, Agent, or Firm* — Ladas & Parry LLP

(57) ABSTRACT

The present invention relates to a magnetite-birnessite mixture, to a synthesis method therefor, and to a water-treatment method using the same. The magnetite-birnessite mixture synthesis method according to the present invention includes: a first synthesis step in which magnetite is synthesized; a second synthesis step in which manganese is made to adsorb onto the surface of the magnetite by supplying manganese while maintaining a basic state in the presence of the magnetite, and then synthesizing birnessite on the surface of the magnetite by supplying an oxidizing agent and sodium, thereby synthesizing a mixture in which magnetite and birnessite are bound together; and a purification step in which the mixture of magnetite and birnessite is purified.

13 Claims, 6 Drawing Sheets

<MAGNETIC SUSCEPTIBILITY ACCORDING TO Fe;Mn MOLAR RATIO>

< XRD PATTERNS OF SYNTHESIS MATERIAL >

<SEM IMAGE OF SYNTHESIZED MATERIAL>

FIG. 5

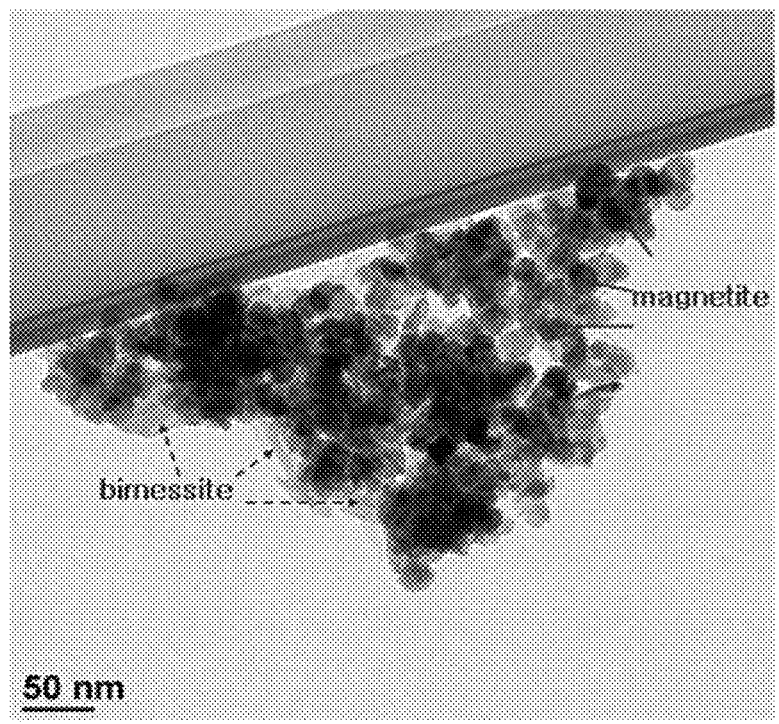

< TEM IMAGE OF SYNTHESIZED MATERIAL>

FIG. 6

| CONCENTRATION RATIO OF Fe IN FIRST SOLUTION WITH RESPECT TO Mn IN THIRD SOLUTION | 1:0.25 | 1:0.5 | 1:1 | 1:2 | 1:4 |
|---|---|---|---|---|---|
| CONCENTRATION RATIO OF Fe AND Mn AS RESULT OF DITHIONITE-CITRATE-BICARBONATE METHOD OF SYNTHESIZED MATERIAL | 1:0.24 | 1:0.5 | 1:0.92 | 1:1.92 | 1:3.60 |

FIG. 7

| CONCENTRATION RATIO OF Fe IN FIRST SOLUTION WITH RESPECT TO Mn IN THIRD SOLUTION | 1:0.25 | 1:0.5 | 1:1 | 1:2 | 1:4 |
|---|---|---|---|---|---|
| CONCENTRATION RATIO OF Fe AND Mn AS RESULT OF DITHIONITE-CITRATE-BICARBONATE METHOD OF SYNTHESIZED MATERIAL | 1:0.24 | 1:0.5 | 1:0.92 | 1:1.92 | 1:3.60 |

FIG. 8

| Fe:Mn OF SYNTHESIZED MATERIAL | 4:1 | 2:1 | 1:1 | 1:2 | 1:4 |
|---|---|---|---|---|---|
| CONCENTRATION OF Cu OF SOLUTION AFTER REACTION IS COMPLETED (mg/L) | 81.4 | 58.9 | 31.6 | 18.5 | 11.5 |
| RATIO OF REMOVING Cu USING SYNTHESIZED MATERIAL (%) | 18.6 | 41.1 | 68.4 | 81.5 | 88.5 |

FIG. 9

| Fe:Mn OF SYNTHESIZED MATERIAL | 4:1 | 2:1 | 1:1 | 1:2 | 1:4 |
|---|---|---|---|---|---|
| CONCENTRATION OF As OF SOLUTION AFTER REACTION IS COMPLETED (mg/L) | 0.021 | 0.022 | 0.034 | 0.445 | 0.761 |
| RATIO OF REMOVING As USING SYNTHESIZED MATERIAL (%) | 97.9 | 97.8 | 96.6 | 55.5 | 23.9 |

US 9,174,196 B2

SYNTHESIS METHOD FOR MAGNETITE AND BIRNESSITE AGGREGATE-FORM MIXTURE

TECHNICAL FIELD

The present invention relates to a water-treatment technique, and more particularly, to an adsorbent that may simultaneously adsorb and remove a positive ion contaminant and a negative ion contaminant, a method for synthesizing the adsorbent, and a water-treatment method using the adsorbent.

BACKGROUND ART

Various methods, such as adsorption, membrane separation, precipitation, biological decomposition, and chemical decomposition, are applied to purify contaminated water. It is very common that positive ion contaminants, such as $Cu^{2+}$, is $Pb^{2+}$, $Zn^{2+}$, $Ni^{2+}$, and $Cd^{2+}$, and negative ion contaminants, $AsO_4^{3-}$, $AsO_3^{3-}$, $Cr_2O_7^{2-}$, $PO_4^{3-}$, $F^-$, and $NO_3^-$ are mixed in contaminated water, such as industry waste water or mine drainage. An existing technique for purifying contaminated water containing both positive ion contaminants and negative ion contaminants is utilized by combining two or more techniques including a process of removing positive ion contaminants and a process of removing negative ion contaminants. Thus, existing contamination purifying methods use several techniques and thus their procedures are complicated and many costs are required.

Various adsorbents for removing positive or negative ion contaminants have been developed and are applied to sites. Methods of removing contaminants using adsorption are largely classified into a method of removing an adsorbent by mixing the adsorbent with contaminated water and then by adsorbing contaminants and a method of removing contaminants by allowing a column filled with an adsorbent to pass. An existing adsorbent has high adsorption performance with respect to positive or negative ions; however, an adsorbent having performance of simultaneously removing positive ions and negative ions is restrictive.

Also, when the adsorbent is mixed with contaminated water and is removed, the adsorbent is configured in the form of fine particles having a wide adsorption area so as to improve an adsorption force with respect to contaminants.

For example, activated carbon that is widely used in sites, is known as being capable of simultaneously removing positive ion contaminants and negative ion contaminants from waste water. Also, activated carbon has a large specific surface area and thus has high adsorption performance. However, it is difficult to separate and recover activated carbon after water treatment is completed.

DETAILED DESCRIPTION OF THE INVENTION

Technical Problem

The present invention provides an adsorbent that may simultaneously adsorb and remove positive ion contaminants and negative ion contaminants, includes fine particles having a large surface area to have high adsorption performance and may improve separation efficiency after water treatment is performed, a method for synthesizing the adsorbent, and a water-treatment method using the adsorbent.

Technical Solution

According to an aspect of the present invention, there is provided a method for synthesizing a magnetite-birnessite mixture, including: a first synthesis step in which magnetite is synthesized; a second synthesis step in which manganese is made to adsorb onto a surface of the magnetite by supplying manganese while maintaining pH at 8 or more in the presence of the magnetite, and then synthesizing birnessite on the surface of the magnetite by supplying an oxidizing agent and sodium, thereby synthesizing an aggregate-form mixture in which magnetite and birnessite are bound together; and a purification step in which the mixture of magnetite and birnessite is purified.

According to another aspect of the present invention, there is provided a magnetite-birnessite mixture that is synthesized using the above method, so as to remove both a positive ion contaminant and a negative ion contaminant.

According to another aspect of the present invention, there is provided a water-treatment method, whereby waste water is treated using the magnetite-birnessite mixture synthesized using the above method, wherein a positive ion contaminant is adsorbed into birnessite and is removed and a negative ion contaminant is adsorbed into magnetite and is removed.

Effect of the Invention

A magnetite-birnessite mixture can be easily synthesized using a synthesis method according to the present invention.

The magnetite-birnessite mixture synthesized according to the present invention may simultaneously adsorb a positive ion contaminant and a negative ion contaminant and thus is effective in waste water treatment.

Also, since the magnetite-birnessite mixture has a small particle size and has a large surface area, the magnetite-birnessite mixture has high adsorption performance with respect to contaminants.

Also, since magnetite is a ferromagnetic substance, the magnetite-birnessite mixture can be easily recovered from purified waste water using a magnetic field after contaminants are adsorbed from waste water.

DESCRIPTION OF THE DRAWINGS

FIG. 5 is a transmission electron microscope (TEM) image of the magnetite-birnessite mixture;

FIG. 6 is a table in which a chemical composition (concentration of Fe and concentration of Mn) of the magnetite-birnessite mixture that is finally synthesized according to a concentration ratio of Fe with respect to Mn when synthesis is performed, is analyzed using a dithionite-citrate-bicarbonate method;

FIG. 7 is a schematic flowchart of a water-treatment method according to an embodiment of the present invention;

FIG. 8 is a table showing the results of testing a ratio of removing copper (Cu) that is a positive ion contaminant of the magnetite-birnessite mixture; and FIG. 9 is a table showing the results of testing a ratio of removing arsenic (As) that is a negative ion contaminant of the magnetite-birnessite mixture.

BEST MODE

Figure 1:
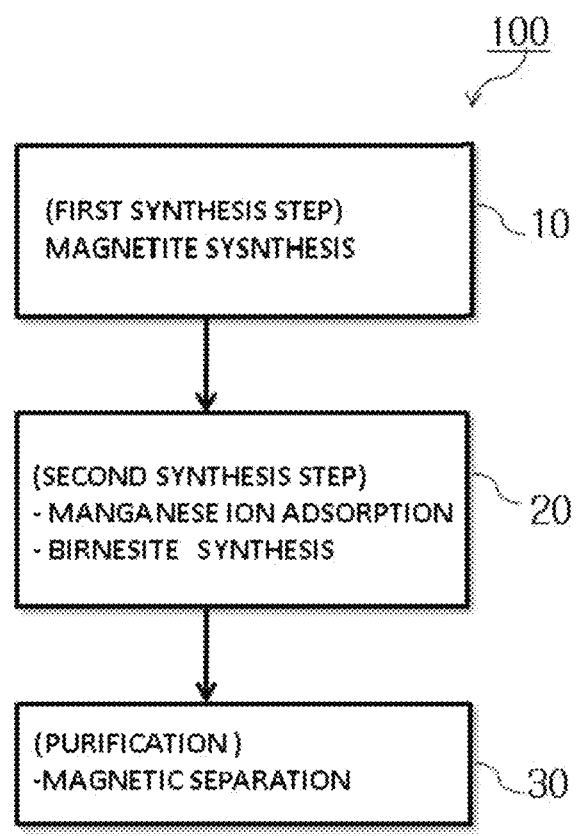
FIG. 1 is a schematic flowchart illustrating a method for synthesizing a magnetite-birnessite mixture according to an embodiment of the present invention.

According to an aspect of the present invention, there is provided a method for synthesizing a magnetite-birnessite mixture, including: a first synthesis step in which magnetite is synthesized; a second synthesis step in which manganese is made to adsorb onto a surface of the magnetite by supplying manganese while maintaining pH at 8 or more in the presence of the magnetite, and then synthesizing birnessite on the surface of the magnetite by supplying an oxidizing agent and sodium, thereby synthesizing an aggregate-form mixture in which magnetite and birnessite are bound together; and a purification step in which the mixture of magnetite and birnessite is purified.

The first synthesis step of synthesizing magnetite may include synthesizing magnetite by mixing a first solution including iron (Fe) ions and a second solution including hydroxyl ions with each other in contact with air.

The first solution may be an iron chloride solution, the second solution may be a sodium hydroxide (NaOH) solution, and the second solution may be mixed with the first solution and pH of the mixture solution may be maintained at 8 or more, more preferably, at 11 to 12.

The second synthesis step may include adding a third solution including manganese (Mn) ions, a fourth solution including sodium ions, and an oxidizing agent for oxidizing the Mn ions in the third solution to the magnetite synthesized in the first synthesis step and maintaining pH of a whole solution including the magnetite, the third solution, and the fourth solution at 8 or more so that birnessite is synthesized on the surface of the magnetite.

The third solution may be a manganese chloride solution, the oxidizing agent may be hydrogen peroxide, and the fourth solution may be a sodium hydroxide (NaOH) solution.

A molar concentration of the sodium hydroxide (NaOH) solution that is the fourth solution may be 3.5 to 5 times a molar concentration of the manganese ions of the third solution and may be 0.25 to 4 times a molar concentration ratio of the Fe ions of the first solution with respect to the Mn ions in the third solution.

In the purification step, the mixture of magnetite and birnessite may be separated using a magnetic force, and a magnet used in the purification step may form a magnetic field having 1,000 to 5,000 gauss.

The mixture of magnetite and birnessite may be formed with a particle size of 6 to 60 μm.

According to another aspect of the present invention, there is provided a magnetite-birnessite mixture that is synthesized using one of the above methods.

According to another aspect of the present invention, there is provided a water-treatment method, whereby waste water is treated using the magnetite-birnessite mixture synthesized using the method, wherein a positive ion contaminant is adsorbed into birnessite and is removed and a negative ion contaminant is adsorbed into magnetite and is removed.

After the contaminants are removed using the magnetite-birnessite mixture, the magnetite-birnessite mixture into which the contaminants are adsorbed, may be separated from waste water using a magnetic force.

A molar concentration of Mn ions for synthesizing the birnessite with respect to a molar concentration of Fe ions for synthesizing the magnetite may be adjusted so as to determine a content ratio of the magnetite and the birnessite in the finally-synthesized magnetite-birnessite mixture, and when a content of the negative ion contaminant is relatively larger than a content of the positive ion contaminant as a result of component analysis of the waste water, a content of the magnetite may be made higher than a content of the birnessite in the magnetite-birnessite mixture, and in an opposite case, the content of the birnessite may be made higher than the content of the magnetite, thereby removing the contaminants.

Mode of the Invention

Hereinafter, a magnetite-birnessite mixture according to an embodiment of the present invention and a synthesis method therefor will be described in more detail with reference to the attached drawings.

FIG. 1 is a schematic flowchart illustrating a method for synthesizing a magnetite-birnessite mixture 100 according to an embodiment of the present invention.

Referring to FIG. 1, the method for synthesizing the magnetite-birnessite mixture 100 according to the current embodiment of the present invention includes a first synthesis step 10, a second synthesis step 20, and a purification step 30.

In the first synthesis step 10, magnetite is artificially synthesized. Magnetite ($Fe_3O_4$) is synthesized by adding a second solution including hydroxyl ions to a first solution including iron (Fe) ions. The first solution and the second solution in a state in which they are exposed to air when they react with each other, are stirred.

In the current embodiment, an iron (I) chloride tetrahydrate ($FeCl_2 \cdot 4H_2O$) solution is used as the first solution including Fe ions. The usage of iron (I) chloride in the form of hydrate is to improve solubility of water. 2-value iron (F) ions are contained in the first solution formed of iron (I) chloride.

Also, in the current embodiment, sodium hydroxide (NaOH) is used as the second solution including hydroxide ions. An NaOH solution is added to the first solution so that a mixture solution in which the first solution and the second solution is mixed, may be maintained in a basic state. In particular, in the current embodiment, the mixture solution is maintained at pH 11 to 12.

The NaOH solution provides enough hydroxyl ions to synthesize the magnetite, and an NaOH solution having the concentration of 0.1 to 5 M is used in the current embodiment. The concentration of the iron (I) chloride tetrahydrate ($FeCl_2 \cdot 4H_2O$) solution depends on the content of the magnetite in a magnetite-birnessite mixture to be finally synthesized.

If the first solution and the second solution are exposed to air and are mixed with each other and then react with each other for about 30 to 60 minutes, the magnetite is formed by the following Formula 1.

$$Fe^{2+} + 2Fe^{3+} + 8OH^- \rightarrow Fe_3O_4 + 4H_2O \quad \text{(Formula 1)}$$

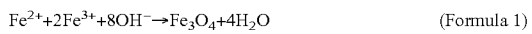

That is, some of the 2-value Fe ions eluted from the first solution are oxidized by dissolved oxygen and are 3-value Fe ions, and the 2-value Fe ions and the 3-value Fe ions consume hydroxyl ions so as to synthesize the magnetite. The magnetite is precipitated in a solid form.

In the current embodiment, the mixture solution should be maintained in the basic (about pH 8 or more) state, because the above Formula 1 is established in the basic state. Furthermore, as pH of the mixture solution increases, particles of the magnetite to be synthesized increase and thus have a large surface area. Thus, the magnetite having high adsorption efficiency is synthesized. However, since the usage of a solution that exceeds pH 12 requires high cost, the second solution is added to maintain pH of 11 to 12.

In the second synthesis step 20, birnessite is synthesized on the surface of magnetite synthesized in the first synthesis step 10 so as to synthesize a mixture in which the magnetite and the birnessite are bound together.

In order to synthesize birnessite on the surface of the magnetite, first, manganese ions are supplied in the presence of the magnetite in a solid state.

The magnetite synthesized in the first synthesis step 10 is used in the current embodiment. In the first synthesis step 10, the magnetite is not separated and dried but a third solution including the manganese ions is added to the mixture solution of the first solution and the second solution in which the solid-state magnetite is precipitated, thereby reacting with each other.

In the current embodiment, manganese (II) chloride tetrahydrate ($MnCl_2 \cdot 4 H_2O$) solution is used as the third solution including the manganese ions. The usage of manganese chloride in the form of hydrate is to improve solubility of water. The concentration of the manganese (II) chloride tetrahydrate ($MnCl_2 \cdot 4 H_2O$) solution is determined by a difference in concentration between the manganese (II) chloride tetrahydrate ($MnCl_2 \cdot 4 H_2O$) and the iron (I) chloride tetrahydrate ($FeCl_2 \cdot 4 H_2O$) solution according to a relative ratio (content ratio) of the birnessite in the magnetite-birnessite mixture to be finally synthesized.

If the third solution is added to the mixture solution of the first solution and the second solution maintained in the basic state, in particular, at pH 11 to 12, the mixture solution is stirred for about 10 minutes and is reacted, the manganese ions are adsorbed onto the surface of the magnetite precipitated in the mixture solution.

Since a point of zero charge (PZC) of the magnetite is about pH 8, the surface of the magnetite has negative charge in the mixture solution of pH 11 to 12. Thus, the manganese ions that are positive ions are electrically adsorbed onto the surface of the magnetite, and the remainder that is not electrically adsorbed onto the surface of the magnetite, exists in the mixture solution.

It is waited until manganese is sufficiently adsorbed onto the magnetite, and a fourth solution including sodium ions and an oxidizing agent are added to the magnetite. In the current embodiment, an NaOH solution is used as the fourth solution including sodium ions, and hydrogen peroxide ($H_2O_2$) is used as the oxidizing agent.

Hydrogen peroxide ($H_2O_2$) having the concentration of 3-6 wt % as the concentration of the oxidizing agent is used to avoid an intense reaction and to oxidize the manganese ions. That is, if the concentration of the oxidizing agent (hydrogen peroxide) is too high, heat and an oxygen gas are generated so that a reaction may intensively proceed. Also, enough sodium ions to form the birnessite should be supplied, and enough hydroxyl ions to neutralize hydrogen ions generated in the synthesis step of the birnessite should be supplied. Thus, an NaOH solution having a molar concentration that is 3.5 to 5.5 times a molar concentration of manganese in the third solution, is used as the fourth solution. An NaOH solution having a molar concentration that is 4 times the molar concentration of manganese in the third solution, is used in the current embodiment.

However, since the NaOH solution that is the second solution is contained in the mixture solution in which the magnetite is precipitated, the concentration of the fourth solution is determined in consideration of the second solution in the mixture solution.

By adding the fourth solution and the oxidizing agent, a reaction as the following Formula 2 occurs.

$$Na^+ + Mn^{3+} + Mn^{4+} + 4OH^- + 15H_2O \rightarrow NaMn_2O_4 \cdot 15H_2O + 4H^+ \quad \text{(Formula 2)}$$

That is, the oxidizing agent oxidizes 2-value manganese ions into 3-value or 4-value manganese ions, and the oxidized manganese ions, the sodium ions, and the hydroxyl ions react with each other and form birnessite ($NaMn_2O_4 \cdot 15 H_2O$). Since the manganese ions in a state in which they are adsorbed onto the surface of the magnetite, are synthesized to the birnessite, the magnetite serves as a crystalline nucleus in which the birnessite is synthesized. Thus, a mixture in which the magnetite and the birnessite are bound together, is formed, and the magnetite and the birnessite form an aggregate.

As described above, if the magnetite-birnessite mixture is synthesized in the solid state in the second synthesis step 20, the purification step 30 of separating the mixture from a solution and purifying is performed.

In the purification step 30, magnetic separation using a magnet is performed so as to separate the solid-state magnetite-birnessite mixture from the solution. Iron oxide and manganese oxide that is a non-magnetic substance coexist in the solution in addition to the magnetite-birnessite mixture that is a magnetic substance. Since the magnetite as the ferromagnetic substance sensitively reacts to a magnetic force and is attached to the magnet, the magnetite may be separated from the solution using magnetism. The magnetite-birnessite mixture may be separated from the solution using a well-known wet magnetic separator (not shown).

In the current embodiment, an electronic magnet having a magnetic field of 1,000 to 5,000 gauss is used as the magnet used in magnetic separation. Since the magnetite is the ferromagnetic substance, the magnetite-birnessite mixture may be easily separated from the solution even though the intensity of the magnetic field is not large.

After magnetic separation is performed, the magnetite-birnessite mixture is finally purified using solid liquid separation and drying.

Characteristics of the magnetite-birnessite mixture that is a resultant structure of the present invention will now be briefly described.

The adsorbent (magnetite-birnessite mixture) that is synthesized according to the present invention is a material in the form of aggregate in which the magnetite that has high adsorption performance with respect to negative ion contaminants and is the ferromagnetic substance and the birnessite having high adsorption performance with respect to positive ion contaminants are bound together and are physically a mass.

Since the magnetite has a PZC of pH 8 and the surface of the magnetite has positive charge in an aqueous solution of less than pH 8, the magnetite adsorbs negative ion contaminants, such as $AsO_4^{3-}$, $AsO_3^{3-}$, $Cr_2O_7^{2-}$, $PO_4^{3-}$, $F^-$, and $NO_3^-$, due to an electrical force. Also, it is known that $AsO_4^{3-}$, $AsO_3^{3-}$, $Cr_2O_7^{2-}$, and $PO_4^{3}$ having chemical attraction with respect to iron oxide are adsorbed at pH 8 or more by chemisorption.

It is known that the birnessite has very high positive ion exchange performance of 240 cmol/kg and a PZC of pH 2. The surface of the birnessite at pH 2 or more has negative charge and has very high adsorption performance absorbing positive ion contaminants, such as $Cu^{2+}$, $Pb^{2+}$, $Zn^{2+}$, $Ni^{2+}$, and $Cd^{2+}$, due to the high positive ion exchange performance.

Also, the size of particles of the magnetite-birnessite mixture according to the present invention is about 6 to 60 μm and is very small. If the particles are small in this manner, the surface area of the particles is much larger than assembly particles having the same weight, and performance of absorbing contaminants may be improved.

Hereinafter, an Experimental Example of the above-described method for synthesizing magnetite-birnessite according to the present invention will be described.

First, magnetite was synthesized. 500 ml of an 0.02 M iron (I) chloride tetrahydrate ($FeCl_2 \cdot 4 H_2O$) solution was put in a 1 l plastic beaker and was stirred while gradually adding an 1 M sodium hydroxide (NaOH) solution to the 0.02 M iron (I) chloride tetrahydrate ($FeCl_2 \cdot 4 H_2O$) solution. The mixed solution was reacted for 30 minutes while maintaining pH 11 to 12 and was synthesized. In order to adsorb manganese to the magnetite after the magnetite was synthesized, 500 ml of a manganese (II) chloride tetrahydrate ($MnCl_2 \cdot 4 H_2O$) solution was added to the mixed solution and then was stirred for about 10 minutes. Synthesis was performed while the concentration of the solution was changed within the range of 0.005 to 0.08 M (concentration that is 0.25 to 4 times concentration of iron).

Subsequently, 500 ml of an NaOH solution containing hydrogen peroxide ($H_2O_2$) with a concentration of 6% was added to the mixed solution, was stirred for 10 minutes, thereby synthesizing the birnessite-magnetite mixture. The concentration of NaOH was 4 times the concentration of manganese of the manganese (II) chloride tetrahydrate ($MnCl_2 \cdot 4 H_2O$) solution.

A finally-synthesized material was precipitated in the beaker, and a magnetic substance and a non-magnetic substance were separated from a suspension using a high gradient magnetic separator with a magnetic field of 1,000 to 5,000 gauss, thereby performing purification.

A mixture obtained in this way was analyzed using mine composition using X-ray diffraction (XRD), chemical composition using a dithionite-citrate-bicarbonate method, and particle patterns and mine composition using scanning electron microscope (SEM) and transmission electron microscope (TEM).

If the magnetite-birnessite mixture was separated from the solution in this experiment, it may be ascertained that the magnetic substance including the magnetite-birnessite mixture is black and the solution only including the non-magnetic substance after the magnetic substance is separated from the suspension, is transparent.

Figure 2:
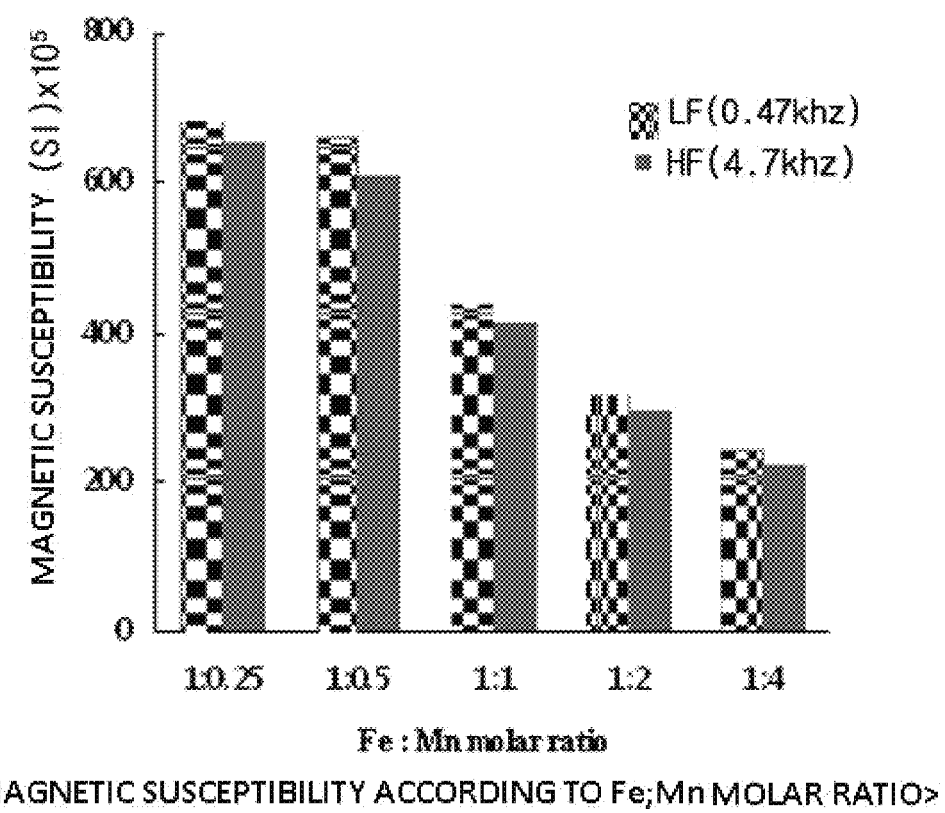
FIG. 2 is a graph showing magnetic susceptibility of the magnetite-birnessite mixture according to concentration of iron (Fe) and concentration of manganese (Mn) when synthesis is performed.
Figure 3:
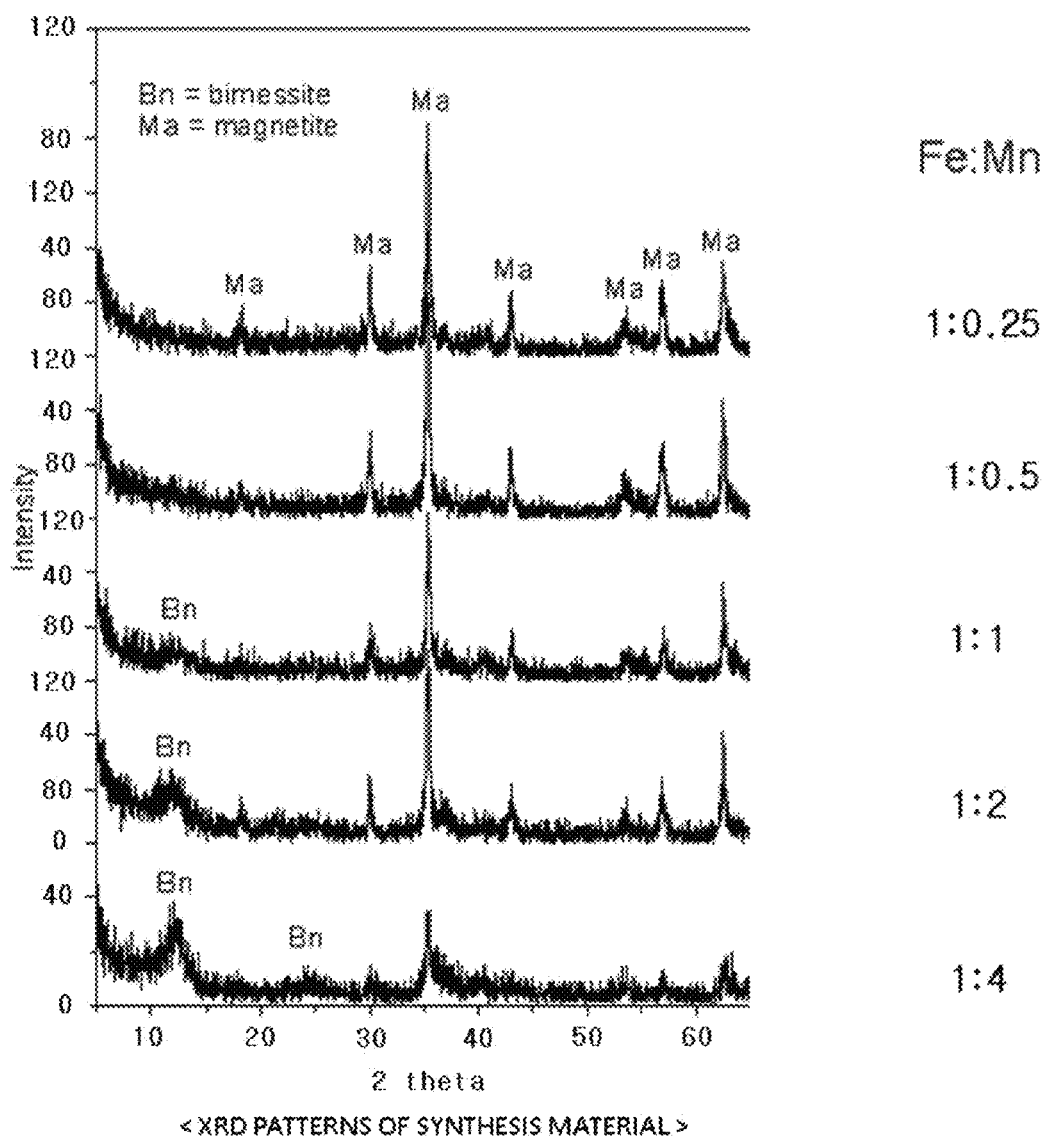
FIG. 3 is an image showing X-ray diffraction (XRD) patterns of the magnetite-birnessite mixture according to concentration of Fe and concentration of Mn when synthesis is performed.

FIG. 2 is a graph showing magnetic susceptibility of the magnetite-birnessite mixture according to concentration of iron (Fe) and concentration of manganese (Mn) when synthesis is performed, and FIG. 3 is an image showing XRD patterns of the magnetite-birnessite mixture according to concentration of Fe and concentration of Mn when synthesis is performed.

As shown in FIG. 2, as the concentration of Fe compared to Mn increases, magnetic susceptibility of the magnetite-birnessite mixture may be increased. As shown in FIG. 3, a synthesized mixture as a result of XRD analysis includes magnetite and birnessite, when synthesis is performed, as the concentration of Mn increases, the content of the birnessite increases, and as the concentration of Fe increases, the content of the magnetite increases.

Figure 4:
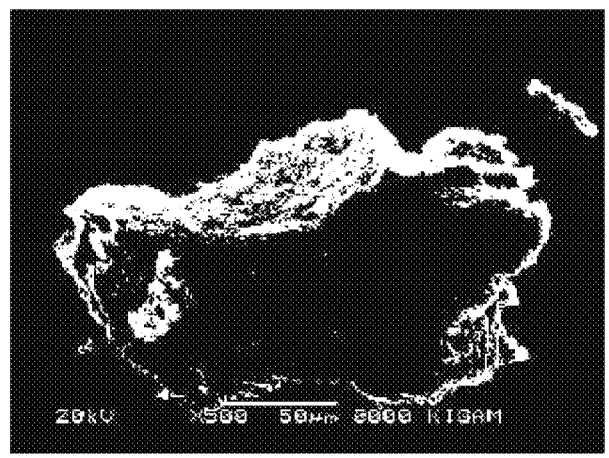
FIG. 4 is a scanning electron microscope (SEM) image of the magnetite-birnessite mixture.

Also, images of the magnetite-birnessite mixture synthesized according to the above Experimental Example are shown in FIGS. 4 and 5. FIG. 4 is a scanning electron microscope (SEM) image of the magnetite-birnessite mixture, and FIG. 5 is a transmission electron microscope (TEM) image of the magnetite-birnessite mixture.

Referring to FIGS. 4 and 5, as a result of observing the shape of the synthesized material using the method according to the present invention with the SEM image and the TEM image, aggregate of birnessite and magnetite having a fine plate shape is observed.

FIG. 6 is a table in which a chemical composition (concentration of Fe and concentration of Mn) of the magnetite-birnessite mixture that is finally synthesized according to a concentration ratio of Fe with respect to Mn when synthesis is performed, is analyzed using a dithionite-citrate-bicarbonate method.

Referring to the table of FIG. 6, as the concentration of a third solution (manganese (II) chloride tetrahydrate ($MnCl_2 \cdot 4 H_2O$) solution) compared to a first solution (iron (I) chloride tetrahydrate ($FeCl_2 \cdot 4 H_2O$) solution) increases, the relative content of Mn in the final synthesized material is increased compared to Fe.

Meanwhile, the present invention provides a water-treatment method of treating waste water using the magnetite-birnessite mixture synthesized using the above-described method.

The water-treatment method according to the present invention is illustrated in FIG. 7. FIG. 7 is a schematic flowchart of the water-treatment method 200 according to an embodiment of the present invention.

Referring to FIG. 7, the water-treatment method 200 according to the current embodiment of the present invention includes waste water analysis (210), magnetite-birnessite synthesis (220), waste water treatment (230), and separation (240).

In waste water analysis (210), the content of a positive ion contaminant and the content of a negative ion contaminant among contaminants in waste water to be treated are analyzed. Through this analysis, when a magnetite-birnessite mixture is synthesized, relative contents of the magnetite and the birnessite may be determined. That is, when the content of the negative ion contaminant is relatively large, when synthesis is performed, the concentration of Fe ions is made relatively higher than the concentration of Mn ions so as to increase the content of the magnetite in the mixture, and when the content of the positive ion contaminant is relatively large, when synthesis is performed, the concentration of Mn ions is increased to increase the content of birnessite.

After waste water analysis is terminated in this way, the magnetite-birnessite mixture is synthesized according to the present invention based on the above analysis result. Also, when synthesis is performed, the relative contents of the magnetite and birnessite are adjusted.

If the magnetite-birnessite mixture is synthesized, the mixture is put in waste water so that the positive ion contaminant and the negative ion contaminant in waste water may be adsorbed into the mixture and waste water is purified.

After the contaminants are adsorbed into the magnetite-birnessite mixture, the magnetite-birnessite mixture is separated from waste water in which purification is completed, using a magnetic separator. Since the magnetite is a magnetic substance, the magnetite-birnessite mixture may be easily separated even at a weak magnetic field (1,000 to 5,000 gauss).

Contaminant adsorption performance with respect to the magnetite-birnessite mixture synthesized according to the present invention is tested, and its results are shown in FIGS. 8 and 9.

FIG. 8 is a table showing the results of testing a ratio of removing copper (Cu) that is a positive ion contaminant of the magnetite-birnessite mixture, and FIG. 9 is a table showing the results of testing a ratio of removing arsenic (As) that is a negative ion contaminant of the magnetite-birnessite mixture.

In order to test performance of removing a positive ion contaminant, 0.02 g of a magnetite-birnessite mixture and 10 ml of an aqueous solution containing Cu 100 mg/L were reacted with each other for one hour and then, the concentration of Cu that remained in the solution was measured. Referring to FIG. 8, as the content of birnessite that is manganese oxide mineral in a synthesized material increased, adsorption of Cu due to the synthesized material was increased.

Also, in order to test performance of removing a negative ion contaminant, 0.05 g of a synthesized material and 50 ml of an aqueous solution containing As (III) 1 mg/L were reacted with each other for one hour and then, the concentration of As that remained in the solution was measured. Referring to FIG. 9, adsorption of the synthesized material with respect to As (III) that is a negative ion contaminant was increased as the content of magnetite that is iron oxide mineral increased.

That is, the contents of the magnetite and the birnessite in the magnetite-birnessite mixture are adjusted according to types of contaminants in waste water so that the performance of removing the positive ion contaminant and the negative ion contaminant can be improved. Of course, in either case, the positive ion contaminant and the negative ion contaminant are removed from the mixture together.

As described above, the magnetite-birnessite mixture synthesized using the method according to the present invention can adsorb both the positive ion contaminant and the negative ion contaminant and has a large surface area and thus has excellent adsorption performance.

Although, in the first synthesis step, the magnetite is synthesized using iron (I) chloride and sodium hydroxide, the magnetite may be synthesized using a material that provides 2-value Fe ions and hydratory. In addition, the usage of a finely-ground solid-state magnetite mineral is included in the concept of synthesis by the first synthesis step.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method for synthesizing a magnetite-birnessite mixture, comprising:
   a first synthesis step in which magnetite is synthesized;
   a second synthesis step in which manganese is made to adsorb onto a surface of the magnetite by supplying manganese while maintaining a basic state in the presence of the magnetite, and then synthesizing birnessite on the surface of the magnetite by supplying an oxidizing agent and sodium, thereby synthesizing a mixture in which magnetite and birnessite are bound together; and
   a purification step in which the mixture of magnetite and birnessite is purified.

2. The method of claim 1, wherein the first synthesis step comprises synthesizing magnetite by mixing a first solution comprising iron (Fe) ions and a second solution comprising hydroxyl ions with each other in contact with air and maintaining a mixture solution in a basic state.

3. The method of claim 2, wherein the first solution is an iron chloride solution and the second solution is a sodium hydroxide (NaOH) solution.

4. The method of claim 2, wherein the second solution is mixed with the first solution and pH of the mixture solution is maintained at 11 to 12.

5. The method of claim 1, wherein the second synthesis step comprises adding a third solution comprising manganese (Mn) ions, a fourth solution comprising sodium ions, and an oxidizing agent for oxidizing the Mn ions in the third solution to the magnetite synthesized in the first synthesis step and maintaining pH of a whole solution comprising the magnetite, the third solution, and the fourth solution at 8 or more so that birnessite is synthesized on the surface of the magnetite.

6. The method of claim 5, wherein the third solution is a manganese chloride solution and the oxidizing agent is hydrogen peroxide.

7. The method of claim 5, wherein the fourth solution is a sodium hydroxide (NaOH) solution.

8. The method of claim 7, wherein a molar concentration of the sodium hydroxide (NaOH) solution is 3.5 to 5 times a molar concentration of the manganese ions of the third solution.

9. The method of claim 1, wherein, in the first synthesis step, the first solution comprising Fe ions is used, in the second synthesis step, the third solution comprising Mn ions is used, and the molar concentration of the sodium hydroxide (NaOH) solution is 0.25 to 4 times a molar concentration ratio of the Fe ions of the first solution with respect to the Mn ions in the third solution.

10. The method of claim 1, wherein, in the purification step, the mixture of magnetite and birnessite is separated using a magnetic force.

11. The method of claim 10, wherein a magnet used in the purification step forms a magnetic field having 1,000 to 5,000 gauss.

12. The method of claim 1, wherein the mixture of magnetite and birnessite is in a form of aggregate.

13. The method of claim 1, wherein the mixture of magnetite and birnessite is formed with a particle size of 6 to 60 µm.

* * * * *